(12) United States Patent
Benavides

(10) Patent No.: US 9,979,173 B2
(45) Date of Patent: May 22, 2018

(54) BUS BAR ASSEMBLY AND METHOD OF MANUFACTURING SAME

(75) Inventor: Nicholas David Benavides, Allison Park, PA (US)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 0 days. days.

(21) Appl. No.: 13/097,654

(22) Filed: Apr. 29, 2011

(65) Prior Publication Data

US 2012/0273252 A1 Nov. 1, 2012

(51) Int. Cl.
*H02G 5/00* (2006.01)

(52) U.S. Cl.
CPC .......... *H02G 5/005* (2013.01); *Y10T 29/4913* (2015.01)

(58) Field of Classification Search
CPC ........... H02G 5/005; H01B 7/02; H01B 13/06
USPC ..... 174/71 B, 72 B, 88 B, 99 B, 149 B, 258, 174/117 R
See application file for complete search history.

(56) References Cited

U.S. PATENT DOCUMENTS

| | | | |
|---|---|---|---|
| 3,504,100 A | | 3/1970 | Yatabe et al. |
| 3,778,735 A | * | 12/1973 | Steenmetser ................ 333/238 |
| 4,003,619 A | | 1/1977 | Smith |
| 4,236,046 A | * | 11/1980 | De Vries ............... H02G 5/005 174/72 B |
| 4,266,091 A | | 5/1981 | Fukuda |
| 4,342,881 A | | 8/1982 | Fukuda et al. |
| 4,381,423 A | | 4/1983 | Taylor |
| 4,382,156 A | | 5/1983 | Jodoin |
| 4,403,108 A | | 9/1983 | DeVries |
| 4,420,653 A | | 12/1983 | Fukuda et al. |
| 4,436,953 A | | 3/1984 | Gottlieb |
| 4,440,972 A | | 4/1984 | Taylor |
| 4,451,694 A | | 5/1984 | Harper et al. |

(Continued)

FOREIGN PATENT DOCUMENTS

| | | |
|---|---|---|
| CN | 2283324 Y | 6/1998 |
| JP | 20000149667 A | 5/2000 |
| WO | 20120148975 A1 | 11/2012 |

OTHER PUBLICATIONS

European Search Report issued in connection with corresponding EP Application No. 12776325.8-1801 dated Sep. 24, 2014.
Chinese Office Action in Application No. 201280021019.3.

*Primary Examiner* — Dhirubhai Patel
(74) *Attorney, Agent, or Firm* — Wood IP LLC

(57) ABSTRACT

A bus bar assembly includes a first main conductor, a second main conductor, and an insulator member provided between the main conductors. The insulator member includes: (i) an insulator component, (ii) a first conductor layer provided on the top surface of the insulator component, and (iii) a second conductor layer provided on the bottom surface of the insulator component, wherein the first conductor layer includes an outer edge around a perimeter thereof, wherein the outer edge is located at least a certain distance from the outer edge around the perimeter of the insulator component, wherein the second conductor layer includes an outer edge around a perimeter thereof, wherein the outer edge is located at least the same certain distance from the outer edge of the insulator component, and wherein the certain distance is sufficient to cause the bus bar assembly to satisfy the creepage requirement of the assembly.

6 Claims, 3 Drawing Sheets

(56) References Cited

U.S. PATENT DOCUMENTS

| | | | |
|---|---|---|---|
| 4,570,031 A | | 2/1986 | Inoue |
| 4,584,768 A | * | 4/1986 | Tosti ..................... H02G 5/005 174/72 B |
| 4,694,123 A | | 9/1987 | Massey |
| 5,172,304 A | | 12/1992 | Ozawa et al. |
| 5,422,440 A | * | 6/1995 | Palma ..................... 174/133 B |
| 5,808,240 A | | 9/1998 | Czerwinski et al. |
| 6,218,622 B1 | * | 4/2001 | Rimmer ................. 174/117 FF |
| 6,320,132 B1 | | 11/2001 | Ykema et al. |
| 7,053,302 B2 | | 5/2006 | Bjorklund et al. |
| 7,102,256 B2 | * | 9/2006 | Murakami ................... 307/147 |
| 7,557,298 B2 | * | 7/2009 | Vanhoutte .............. H02G 5/005 174/149 B |
| 9,137,888 B2 | * | 9/2015 | Kusukawa ............. H02G 5/005 |
| 2004/0060725 A1 | | 4/2004 | Behziz et al. |
| 2008/0196924 A1 | | 8/2008 | Beulque |
| 2012/0300417 A1 | * | 11/2012 | Kusukawa et al. ........... 361/748 |

* cited by examiner

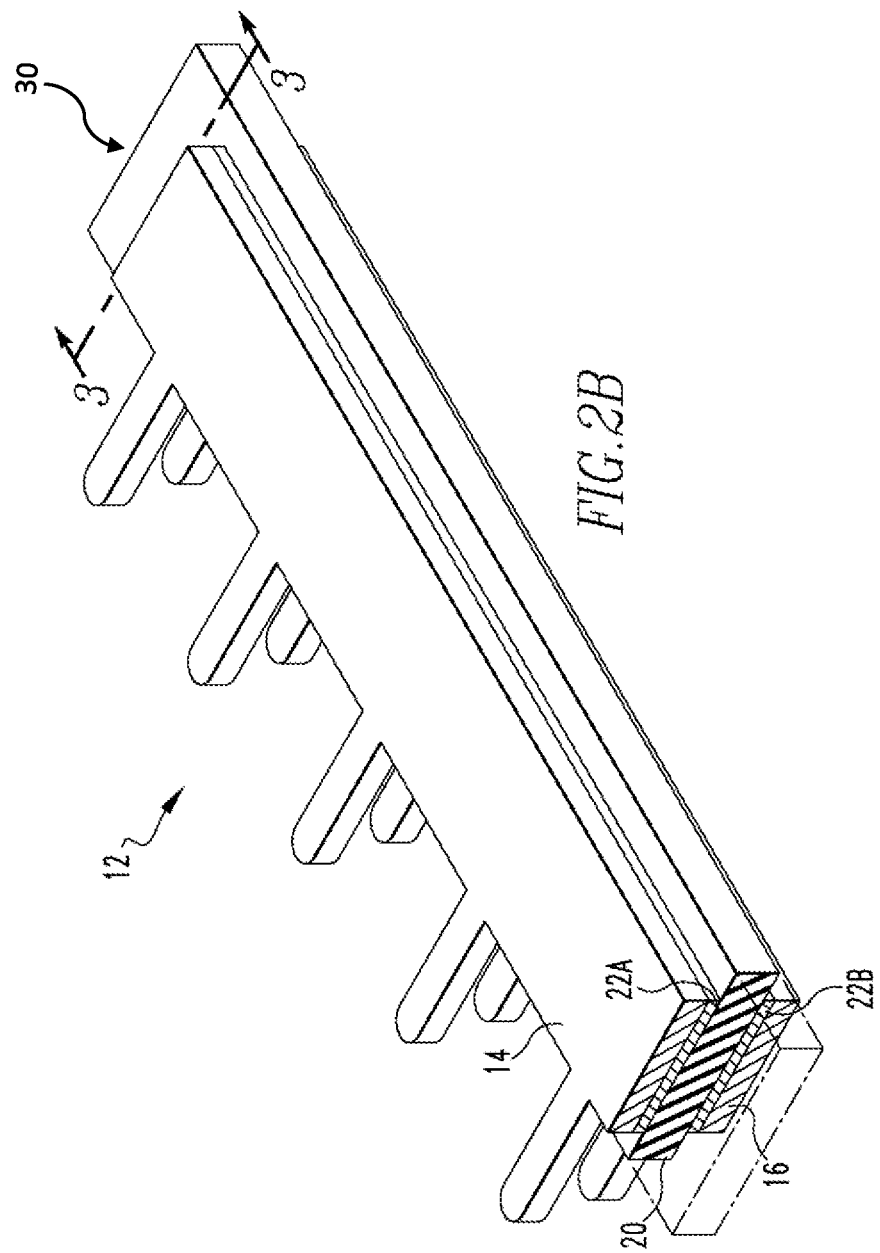

BUS BAR ASSEMBLY AND METHOD OF MANUFACTURING SAME

GOVERNMENT CONTRACT

This invention was made with government support under U.S. Navy Contract (NAVSEA) N00024-07. The United States government may have certain rights in the invention.

FIELD OF THE INVENTION

The present invention relates to bus bar devices, and in particular, to a bus bar assembly that includes a conductive cladding provided on the insulator layer to increase the partial discharge inception voltage.

BACKGROUND OF THE INVENTION

A bus bar is a multilayer device that is commonly used for power and/or signal distribution in electronic systems and power conversion equipment. Bus bars generally include at least two conductors (usually in the form of elongated strips or bars of a metal conductor such as copper) separated by an insulating layer made of, for example, a dielectric material. The conductors typically have a number of distribution pins extending therefrom which enable electrical connections to be made between the conductors and the remainder of the circuit components.

FIG. 1 is a cross-sectional view of a portion of a prior art bus bar assembly 2. Bus bar assembly 2 includes a first main conductor 4 made of, for example copper, a second main conductor 6 also made of, for example copper, and an insulator layer 8 made of, for example, a dielectric material, provided between the first main conductor 4 and the second main conductor 6. Typically, air 10 is trapped in small air voids that exist between first main conductor 4 and insulator layer 8 and between second main conductor 6 and insulator layer 8. Air 10 in the air voids frequently leads to a plasma creation in the air voids known as partial discharge. The Partial discharge is problematic as it slowly breaks down the material of insulator layer 10. The partial discharge effect is caused by the high field strength that is used in a dielectric insulator, and is exacerbated by the relative dielectric constant of insulator layer 8 as compared to the dielectric constant of air 10, which causes the field to concentrate in the small air voids. While this does not lead to an arc, it does lead to the plasma creation known as partial discharge.

There is thus a need for a bus bar assembly that decreases the likelihood of the occurrence of partial discharge in the bus bar assembly.

SUMMARY OF THE INVENTION

In one embodiment, a bus bar assembly for use in an application having a creepage distance requirement is provided that includes a first main conductor, a second main conductor, and an insulator member provided between the first main conductor and the second main conductor. The insulator member includes: (i) an insulator component having a top surface, a bottom surface, and a first outer edge around a perimeter thereof, (ii) a first conductor layer provided on the top surface of the insulator component, and (iii) a second conductor layer provided on the bottom surface of the insulator component, wherein the first conductor layer includes a second outer edge around a perimeter thereof, wherein the second outer edge is located at least a certain distance from the first outer edge around the perimeter of the insulator component, wherein the second conductor layer includes a third outer edge around a perimeter thereof, wherein the third outer edge is located at least the certain distance from the first outer edge around the perimeter of the insulator component, and wherein the certain distance is sufficient to cause the bus bar assembly to satisfy the creepage requirement.

In another embodiment, a method of making a bus bar assembly is provided that includes determining a creepage distance requirement for the bus bar assembly, forming an insulator member as just described, and affixing the insulator member between a first main conductor and second main conductor.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 2A is an exploded view and FIG. 2B is an isometric view of a portion of a bus bar assembly according to one exemplary embodiment of the present invention;

DESCRIPTION OF THE PREFERRED EMBODIMENTS

Figure 1:
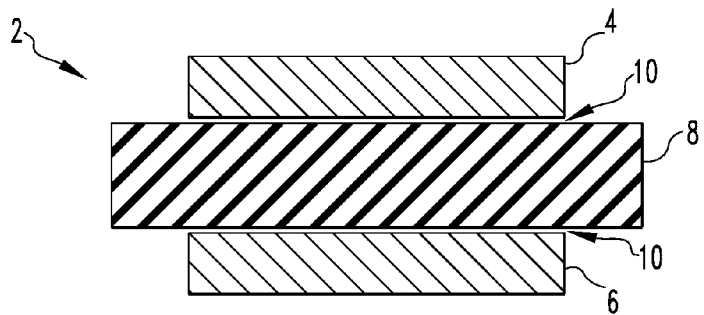
FIG. 1 is a cross-sectional view of a portion of a prior art bus bar assembly.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the term "number" shall mean one or an integer greater than one (i.e., a plurality).

Figure 3:
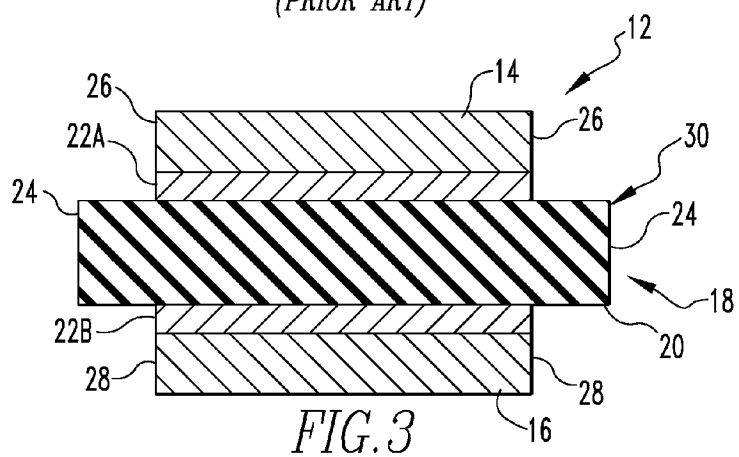
FIG. 3 is a cross-sectional view of the bus bar assembly of FIG. 2 taken along lines 3-3 in FIG. 2.
Figure 2A:
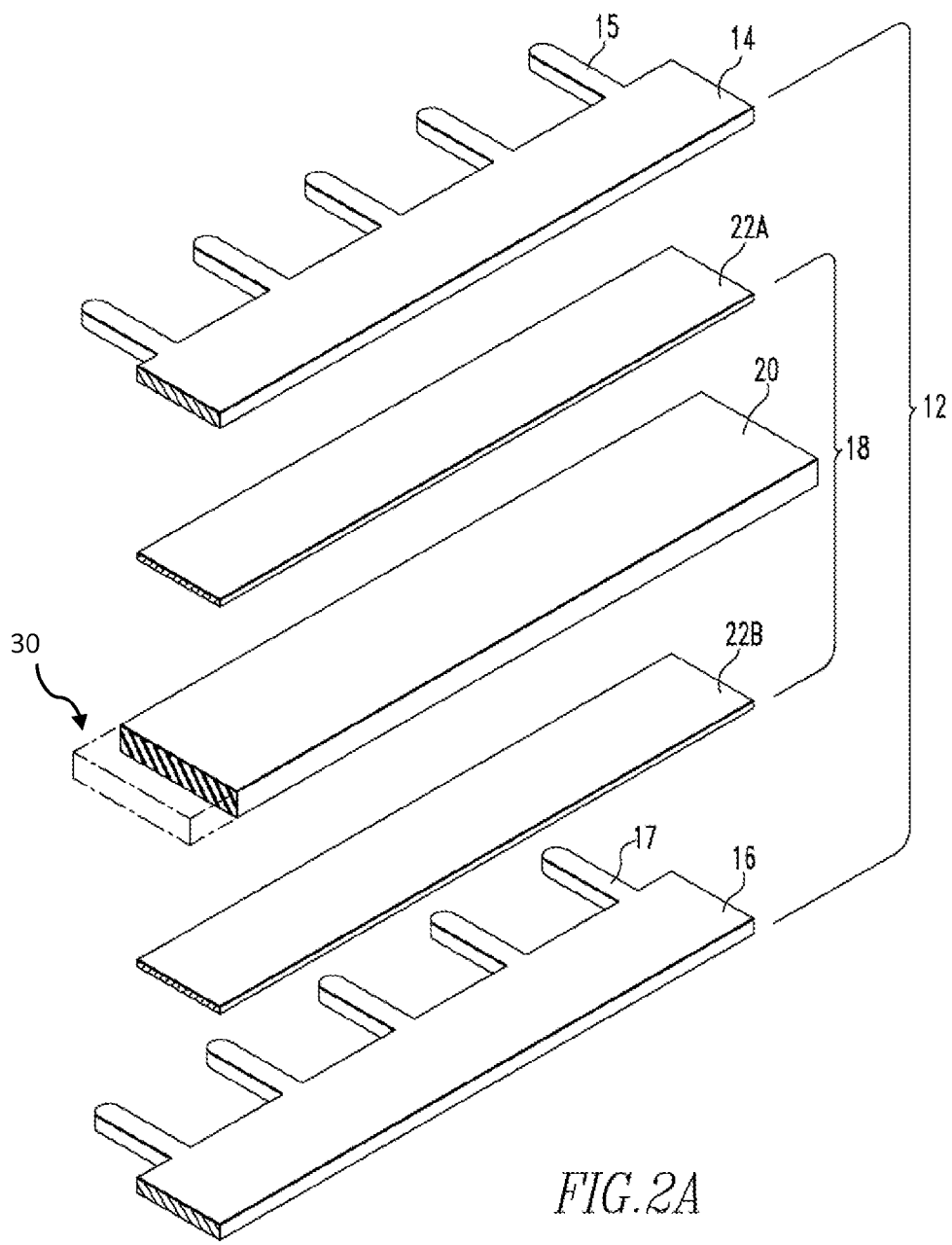

FIG. 2A is an exploded view and FIG. 2B is an isometric view of a portion of a bus bar assembly 12 according to one exemplary embodiment of the present invention. FIG. 3 is a cross-sectional view of bus bar assembly 12 taken along lines 3-3 in FIG. 2A. Bus bar assembly 12 includes a first main conductor 14 having distribution prongs or fingers 15 and a second main conductor 16 having distribution prongs or fingers 17. In the exemplary embodiment, first main conductor 14 and second main conductor 16 are made of copper, although other suitable conductive materials, such as other metals, may also be used. A plated insulator member 18 is provided in between first main conductor 14 and second main conductor 16.

As seen in FIGS. 2A, 2B and 3, plated insulator member 18 includes insulator element 20 having a conductor layer 22A provided on a top surface thereof and a conductor layer 22B provided on a bottom surface thereof In the exemplary embodiment, insulator element 20 is sheet of dielectric material such as, without limitation, fibre-reinforced 4 (FR-4), Glass Polyester-2 (GP0-2) or GP0-3, or ceramic dielectric material. Also in the exemplary, non-limiting embodiment, plated insulator member 18 is made by plating conductor layer 22A on the top surface of insulator element 20 and plating conductor layer 22B on the bottom surface of insulator element 20 is made by plating conductor layers 22A, 22B onto insulator element 20 using any suitable metal plating technique, such as any of a number of known plating techniques used in printed circuit board manufacture to lay metallization onto a dielectric substrate such as FR-4. The deposition of conductor layers 22A, 22B onto insulator element 20 as just described will shift the charge point to the surface of each of conductor layers 22A, 22B. In the exemplary embodiment, the plating process will ensure that no air is trapped between conductor layer 22A and the top surface of insulator element 20 or between conductor layer 22B and the bottom surface of insulator element 20 (i.e., the possibility of entrained air or voids is eliminated). Alternatively, conductor layers 22A, 22B may be deposited on the respective surfaces of insulator element 20 using other suitable deposition methods, such as, without limitation, vapor deposition or sputtering, wherein no air is trapped between conductor layer 22A and the top surface of insulator element 20 or between conductor layer 22B and the bottom surface of insulator element 20.

The metallization deposited on both the top and bottom surfaces of insulator element 20 is then etched back from each of the outer edges 24 of insulator element 20 by an amount/distance that will make the creepage distance for bus bar assembly 12, when finally assembled as described herein, appropriate for the given application, thereby forming plated insulator member 18. In the exemplary, non-limiting embodiment shown in FIGS. 2A, 2B and 3, the plating on both the top and bottom surfaces of insulator element 20 is etched back an amount/distance at each outer edge location 24 that will result in conductor layer 22A being aligned with the adjacent outer edge portion 26 (not including prongs 15) of first main conductor 14 and conductor layer 22B being aligned with the adjacent outer edge portion 28 (not including prongs 17) of second main conductor 16 when bus bar assembly 12 is assembled as described below. In the exemplary, non-limiting embodiment, the remaining plating comprising conductor layers 22A, 22B are then tinned or plated to prevent corrosion.

In an alternative embodiment, rather than the metallization being etched back as just described, the metallization is selectively deposited on both the top and bottom surfaces of insulator element 20 in a manner wherein conductor layer 22A is aligned with the adjacent outer edge portion 26 (not including prongs 15) of first main conductor 14 and conductor layer 22B is aligned with the adjacent outer edge portion 28 (not including prongs 17) of second main conductor 16 when the bus bar assembly 12 is assembled.

After plated insulator member 18 is formed as just described, first main conductor 14 is coupled to the top surface of plated insulator member 18 on top of conductor layer 22A in a manner wherein first main conductor 14 is electrically coupled to conductor layer 22A and second main conductor 16 is coupled to the bottom surface of plated insulator member 18 on top of conductor layer 22B in a manner wherein second main conductor 16 is electrically coupled to conductor layer 22B. In the exemplary embodiment, this is accomplished by sandwiching plated insulator member 18 between first and second main conductors 14, 16 using, for example, a non-conductive clamp or bracket, although other suitable affixation methods (e.g., an adhesive) may also be employed. As can be seen in FIGS. 2A, 2B and 3, due to the etching back of the metallization to form conductor layers 22A, 22B, bus bar assembly 12 will include an overhanging insulator portion 30 that extends beyond both first and second main conductors 14, 16 and the conductor layers 22A, 22B around the outer perimeter of bus bar assembly 12. As noted above, overhanging insulator portion 30 will increase the surface path distance between first and second main conductors 14, 16 and, depending on the amount of etching selectively performed, enable bus bar assembly 12 to satisfy the creepage distance requirements of the application for which it is being made. In any particular application, the required creepage distance is determined by the voltage that will be applied to the two conductors (first and second main conductors 14, 16) and whatever standard is appropriate (e.g., IEC or UL). More fundamentally, the required creepage distance is determined to prevent arcing between the two conductors under reasonable cases of contamination and air quality. Typically, this is anywhere from 0.5 inches for low voltages (<1 kV), several inches for medium voltages (e.g., 1-30 kV), and several feet for high voltages (>30 kV). In addition, the required creepage distance is typically greater than the required air gap between two conductors because an arc may travel across moisture or other contaminates deposited on the surface.

Moreover, by including plated insulator member 18 as just described, the inception voltage of partial discharge for bus bar assembly 12 will be increased significantly, thereby reducing the likelihood that detrimental partial discharge will occur. Furthermore, if air is trapped between first main conductor 14 and conductor layer 22A and/or between second main conductor 16 and conductor layer 22B, partial discharge there between will be prevented because both surfaces will be at the same potential.

Figure 4:
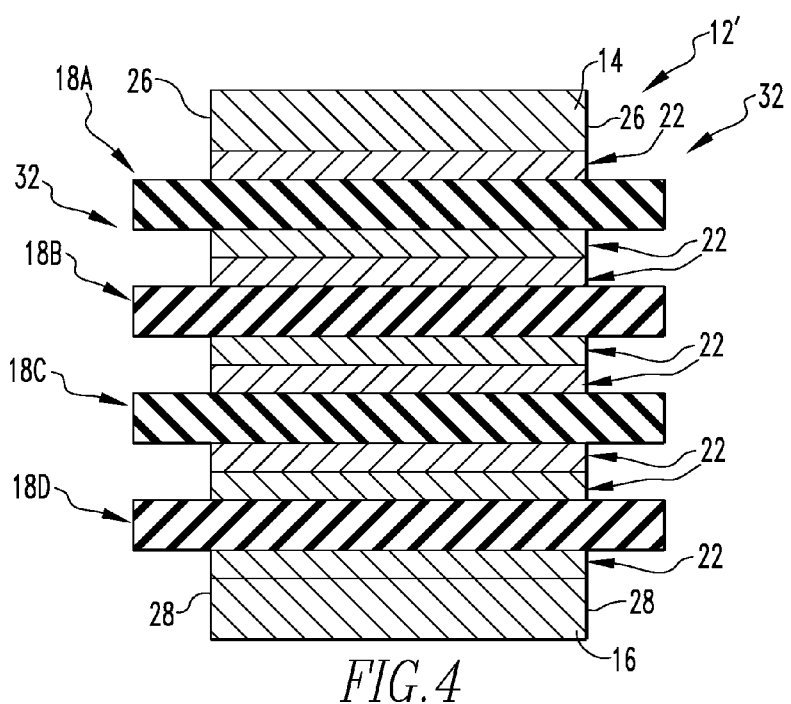
FIG. 4 is a cross-sectional view of a portion of a bus bar assembly according to an alternative exemplary embodiment of the present invention.

FIG. 4 is a cross-sectional view of a portion of a bus bar assembly 12' according to an alternative exemplary embodiment of the present invention. Bus bar assembly 12' includes a number of the same components as bus bar assembly 12, and like components are labeled with like reference numerals in FIG. 4. As seen in FIG. 4, bus bar assembly 12' a first main conductor 14 and a second main conductor 16 which, in the exemplary embodiment, are made of copper, although other suitable conductive materials, such as other metals, may also be used. In Addition, a plurality of plated insulator members 18 as described elsewhere herein are provided in between first main conductor 14 and second main conductor 16. In the illustrated embodiment, four plated insulator members 18A, 18B, 18C and 18D are provided in between first main conductor 14 and second main conductor 16, although more or less plated insulator members 18 may also be used within the scope of the present invention. As described elsewhere herein, the conductor layers 22 on each plated insulator member 18 are formed by depositing a conductive material on the respective surface of the plated insulator member 18 and etching that conductive material back from the edge of the associated insulator element 20 so that overhanging insulator portion 32 comprising a plurality of overhanging insulator portions 30 will be formed when bus bar assembly 12' is assembled. In the exemplary embodiment, bus bar assembly 12' is assembled by sandwiching plated insulator members 18A, 18B, 18C, 18D between first and second main conductors 14, 16 using, for example, a non-conductive clamp or bracket, although other suitable affixation methods (e.g., an adhesive) may also be employed. Overhanging insulator portion 32 comprising the plurality of overhanging insulator portions 30 will increase the surface path distance between first and second main conductors 14, 16 and, depending on the amount of etching selectively performed, enable bus bar assembly 12' to satisfy the creepage distance requirements of the application for which it is being made.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A bus bar assembly, comprising:
   a first main conductor having first outer edges;
   a second main conductor having second outer edges aligned with the first outer edges; and
   a plated insulator member (i)provided between the first and second main conductors and (ii) including;
   an insulator component formed of a single sheet of dielectric material comprising third outer edges,
   a first conductor layer plated on a top surface of the insulator component, and
   a second conductor layer plated on a bottom surface of the insulator component, the plated first and second conductor layers preventing a trapping of air with the insulator component,
   wherein all outer edges of the first and second conductor layers align with all of the first and second outer edges,
   wherein the third outer edges create an overhanging portion of the insulator component extending beyond the first and second outer edges and the outer edges of the first and second conductor layers, and
   wherein no air is trapped between the first conductor layer and the top surface of the insulator component, and wherein no air is trapped between the second conductor layer and the bottom surface of the insulator component.

2. The bus bar assembly according to claim 1,
   wherein the first conductor layer includes a first conductive material onto the top surface of the insulator component and the outer edge of the first conductor layer is at least a certain distance from the third outer edges around the total perimeter of the insulator component, and
   wherein the second conductor layer includes a second conductive material onto the bottom surface of the insulator component and the outer edge of the second conductor layer is at least the length of the overhanging portion from the third outer edges around the total perimeter of the insulator component.

3. The bus bar assembly according to claim 2, wherein the first and second conductive materials are copper.

4. The bus bar assembly according to claim 3, wherein the insulator component is a sheet of dielectric material selected from the group consisting of fibre-reinforced 4 (FR-4), glass polyester-2 (GPO-2), glass polyester-3 (GPO-3), and a ceramic dielectric material.

5. A bus bar assembly, comprising:
   a first main conductor, and a second main conductor, each having outer edges; and
   a plated insulator member (i) sandwiched between the first and second main conductors, and (ii) comprising:
   an insulator component formed of a single sheet of dielectric material and having outer edges;
   a first conductor layer plated on a top surface of the insulator component and a second conductor layer plated on a bottom surface of the insulator component, the plated first and second conductor layers preventing a trapping of air with the insulator component, wherein all outer edge of the first and second conductor layers align with all the outer edges of the first main conductor,
   wherein the outer edges of the insulator component create a creepage distance forming an overhanging portion extending beyond the outer edges of the first main conductor and the second main conductor and the outer edges of the first and second conductor layers, and
   wherein no air is trapped between the first conductor layer and the top surface of the insulator component, and wherein no air is trapped between the second conductor layer and the bottom surface of the insulator component.

6. The bus bar assembly of claim 5, wherein a thickness of the plated insulator member is greater than a thickness of the first main conductor and a thickness of the second main conductor.

* * * * *